Figure 8:
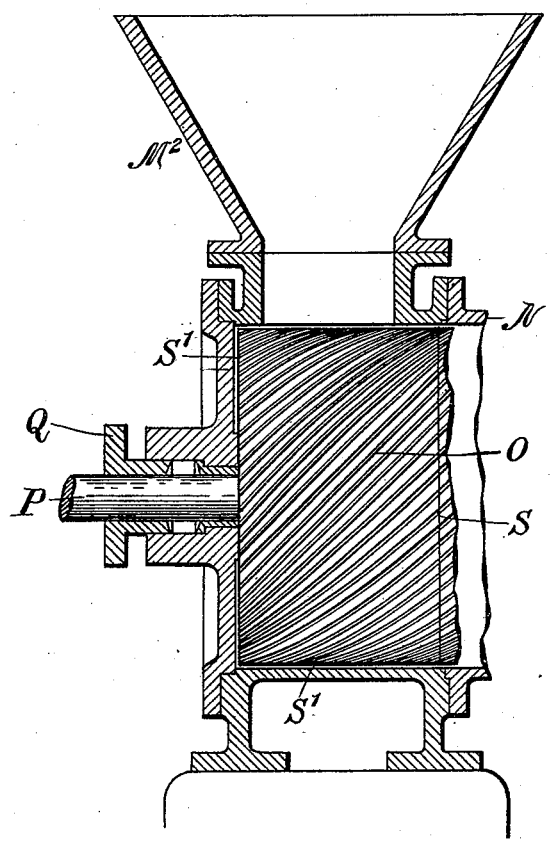

(No Model.) G. J. ATKINS. 3 Sheets—Sheet 1.
AMALGAMATING APPARATUS FOR SEPARATING GOLD AND OTHER METALS FROM THEIR ORES.
No. 473,104. Patented Apr. 19, 1892.
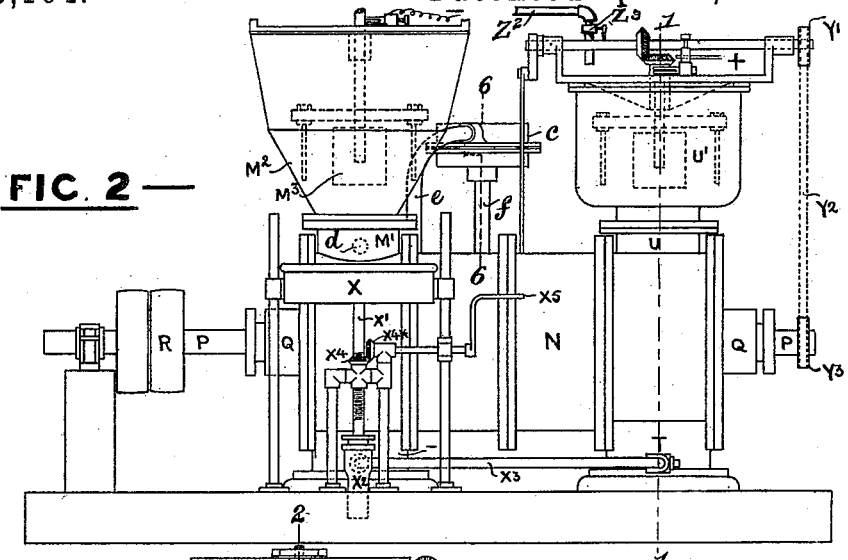
FIG. 2
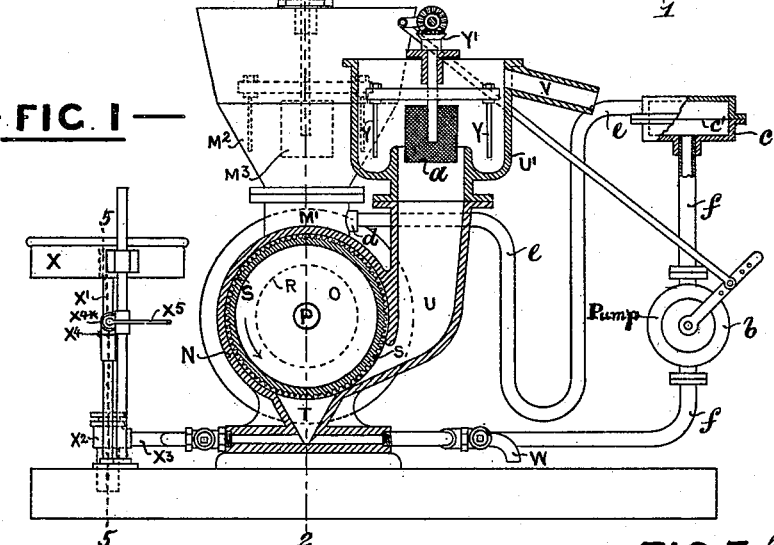
FIG. 1
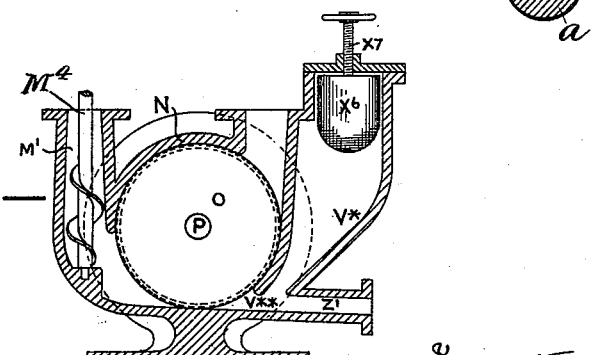
FIG. 3
FIG. 7
Witnesses
Inventor
Geo. J. Atkins (No Model.) 3 Sheets—Sheet 2.
G. J. ATKINS.
AMALGAMATING APPARATUS FOR SEPARATING GOLD AND OTHER METALS FROM THEIR ORES.
No. 473,104. Patented Apr. 19, 1892.
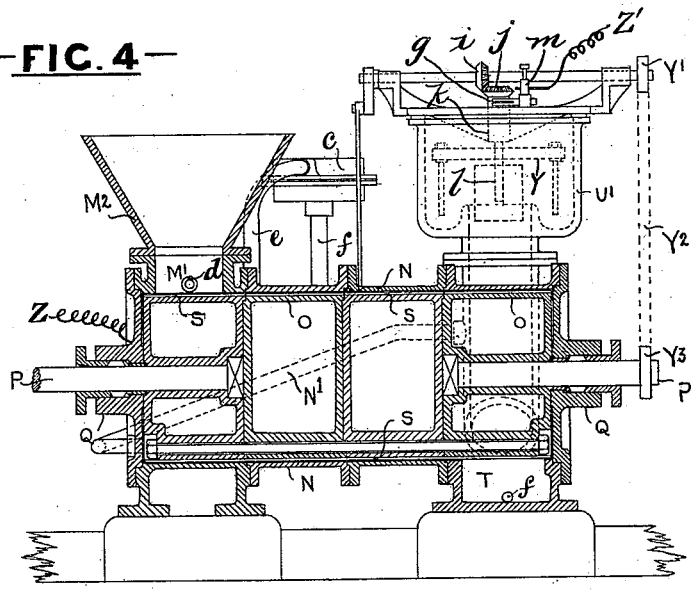
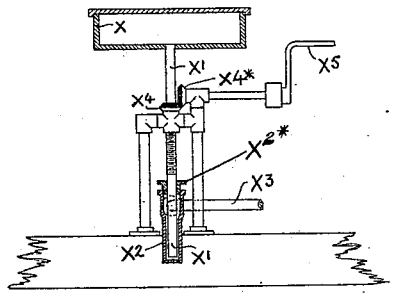
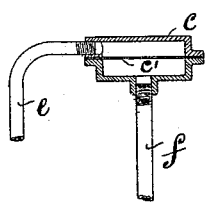

(No Model.) 3 Sheets—Sheet 3.

G. J. ATKINS.
AMALGAMATING APPARATUS FOR SEPARATING GOLD AND OTHER METALS FROM THEIR ORES.

No. 473,104. Patented Apr. 19, 1892.

UNITED STATES PATENT OFFICE.

GEORGE J. ATKINS, OF LONDON, ENGLAND.

AMALGAMATING APPARATUS FOR SEPARATING GOLD AND OTHER METALS FROM THEIR ORES.

SPECIFICATION forming part of Letters Patent No. 473,104, dated April 19, 1892.

Application filed April 28, 1891. Serial No. 390,864. (No model.) Patented in England September 28, 1886, No. 12,295; in France November 24, 1887, No. 187,179; in Germany November 27, 1887, No. 45,774; in India, of 1887, No. 235; in Cape of Good Hope December 9, 1887, No. 425; in Natal December 19, 1887; in Canada December 20, 1887, No. 28,212; in Victoria December 21, 1887, No. 5,523; in New South Wales December 22, 1887, No. 403; in South Australia December 24, 1887, No. 931; in Tasmania December 29, 1887, No. 520/10; in Queensland December 29, 1887, No. 373; in New Zealand January 4, 1888, No. 2,722; in Spain April 27, 1888, No. 12,412/7,697; in Austria-Hungary May 13, 1888, No. 49,944 and No. 11,502, and in Transvaal November 22, 1889, No. 140.

*To all whom it may concern:*

Be it known that I, GEORGE JONES ATKINS, electrician, a subject of the Queen of Great Britain, residing at Tottenham, London, in the county of Middlesex and Kingdom of Great Britain, have invented a new or Improved Amalgamating Apparatus for Separating Gold and other Metals from their Ores, (for which I have received Letters Patent in England, No. 12,295, dated September 28, 1886; in France, No. 187,179, dated November 24, 1887; in Germany, No. 45,774, dated November 27, 1887; in Austria-Hungary, No. 49,944 and No. 11,502, dated May 13, 1888; in Spain, No. 12,412/7,697, dated April 27, 1888; in Canada, No. 28,212, dated December 20, 1887; in India, No. 235 of 1887; in Cape of Good Hope, No. 425, dated December 9, 1887; in Natal, dated December 19, 1887; in Queensland, No. 373, dated December 29, 1887; in Tasmania, No. 520/10, dated December 29, 1887; in New Zealand, No. 2,722, dated January 4, 1888; in Victoria, No. 5,523, dated December 21, 1887; in New South Wales, No. 403, dated December 22, 1887; in South Australia, No. 931, dated December 24, 1887, and in Transvaal, No. 140, dated November 22, 1889,) of which the following is a specification.

This invention relates to a new or improved amalgamating apparatus for separating gold and other metals from their ores, specially applicable for use in conjunction with the electrolytic apparatus for which I have applied for a patent in the United States at same time as this present, Serial No. 390,866; but also applicable for use independently of such electrolytic apparatus.

In the drawings hereto annexed, Figure 1 is a transverse sectional elevation on line 1 1 of Fig. 2 of an amalgamator constructed in accordance with my invention. Fig. 2 is a front elevation of same. Fig. 3 is a transverse section on the same plane as Fig. 1 of a somewhat modified form of same. Fig. 4 is a longitudinal vertical section on line 2 2 of Fig. 2. Fig. 5 is a vertical section of a regulator for the mercury used with this machine, taken on line 5 5 of Fig. 1, some of the parts being left unsectioned. Fig. 6 is a vertical section of a mercury-strainer used with this machine, taken on line 6 6 of Fig. 2, the pipe $f$ being left unsectioned. Fig. 7 is a detail view in cross-section of the carbon $a$; and Fig. 8 is a vertical section through the hopper, one end of the cylinder, and proximate parts on the same plane as Fig. 4, the drum, however, being shown in elevation.

The amalgamating apparatus consists of a horizontal cylinder N, of cast-iron or slate, for example, with closed ends and containing a revolving drum O, carried by the shaft P, revolving in stuffing-boxes Q in the covers of the cylinder N and driven by a pulley R or otherwise. The periphery and sides or ends of the drum O fit more or less closely the interior of the said cylinder N. Grooves or channels S are formed across the periphery of the drum O, preferably in a more or less oblique direction, as shown in Fig. 8, and the spaces thus formed, as well as the clearance-spaces S' between the drum and the cylinder, are filled with mercury, a well or sump T for a reserve of mercury being also preferably provided at the bottom of the cylinder N.

The crushed or pulverized ore is introduced from the before-mentioned electrolytic apparatus or from any other source of supply into the amalgamator through the passage M' at one end of the cylinder N, the said passage being provided with a rotary screw-bladed stirrer M⁴, which aids in preventing the said passage from being clogged and to force the ore into the amalgamating-cylinder. The crushed ore then enters the grooves or channels in the periphery of the drum O and is carried down by the revolution of the said drum in the direction of the arrow to the lower part of the cylinder N through the mercury therein and rises at the other side as the drum continues its revolution, the oblique direction of the grooves or channels assisting it to gradually make its way to the opposite end of the drum after being carried round and round therein several times through the mercury, and it finally escapes from the grooves or channels in the periphery of the drum by rising, on account of its inferior density, through the mercury at an outlet-passage U at the opposite end of the cylinder N and passes away by the spout V.

It will be understood that in passing through the amalgamator the particles of ore are in a constant state of agitation and are brought into intimate or rubbing contact with the mercury, and that consequently any gold or silver contained in or mixed with the ore is retained by the said mercury, which is periodically or continuously drawn off through the tap W and the gold and silver separated from it in the usual way.

In order to regulate the level of the mercury in the amalgamating apparatus, and thereby the quantity of ore passing through the apparatus in a given time, I employ a mercurial regulator consisting of a reservoir X, at the bottom of which is a pipe $X'$, opening into a chamber $X^2$, connected by a pipe $X^3$ with the mercury in the cylinder N. The lower end of the pipe $X'$ passes through a stuffing-box $X^{2*}$ at the top of the chamber $X^2$, so that the said pipe $X'$, with the reservoir X, may be raised and lowered within certain limits by means of the bevel-gearing $X^4$ $X^{4*}$, operated by the crank-handle $X^5$. The bevel-wheel $X^4$ is screw-threaded internally, and the pipe $X'$ is screw-threaded through it, so that as the crank-handle $X^5$ is turned in one direction or the other the bevel-wheel $X^4$ is rotated likewise in its bearing and acts as a nut upon the screwed part of the pipe $X'$, raising or lowering the same with the reservoir X. When it is desired to increase the quantity of mercury in the amalgamating apparatus, so as to produce a greater head of mercury, and thereby to retard the flow of ore from the electrolytic apparatus or other source of supply, the reservoir X and pipe $X'$ are raised and more or less of the mercury flows from the reservoir X into the cylinder N, and when it is desired to reduce the quantity of mercury in the amalgamating apparatus, so as to produce a less head of mercury, and thereby to increase the flow of ore from the electrolytic apparatus or other source of supply, the reservoir X and the pipe $X'$ are lowered and more or less of the mercury flows from the cylinder N into the reservoir X.

Sometimes the mass of gangue issuing at the outlet-passage U from the amalgamating apparatus is in the form of a stiff paste, and therefore does not pass away freely or carries with it some of the mercury. In order to facilitate its passage out of the apparatus and to prevent it from carrying mercury with it, I employ a rotary stirrer Y, revolving in the hopper $U'$ at the upper end of the outlet-passage U and driven by a pulley $Y'$, actuated by a cord or band $Y^2$, passing round the pulley $Y^3$ on the shaft P, or by other suitable means. In some cases I assist the action of the stirrer Y by introducing a stream of water or other suitable liquid through pipe $Z^2$ and cock $Z^3$ or any other suitable means of supply, whereby the mass of gangue is softened before being acted on by the stirrer Y, and thus reduced to such a consistency that it will readily pass out of the apparatus.

Instead of the above-described stirring-apparatus I may employ a series of any suitable form of concentrators or settlers.

In cases where it is desired to recover gold or other of the nobler metals when found in a free state, unaccompanied by refractory substances, the amalgamating apparatus above described is preferably used without the above-mentioned electrolytic apparatus, the sand, ore, or gangue being caused to pass through a hopper or other chamber $M^2$, fitted with agitating apparatus $M^3$, and supplied with water or a suitable solution, and then through the amalgamating apparatus, as before described, the column of solution and gangue being balanced by the column of mercury in the amalgamator and outlet-passage U.

I sometimes connect the amalgamating apparatus with the negative pole of a source of electricity, by means of a conductor Z, for example, and arrange a positive pole in the inlet and outlet passages, whereby such apparatus becomes part of the negative pole, so as to prevent the corroding action of the electrolytic solution upon the said apparatus and the mercury contained therein when such solution is of a nature which would otherwise cause it to act upon them. This arrangement also preserves the mercury in a clean condition. In the drawings, $a$ represents one of these positive poles, formed of a block of carbon or other suitable conducting substance, placed in the mouth of the outlet-passage U, such block $a$ being placed in electrical connection with the positive pole of the above-mentioned dynamo or other source of electricity by means of the conductor $Z'$, connected to a brush $g$, which bears against the boss of the pinion $j$, fixed on the shaft $l$ of the stirrer Y, the bearing $k$ of which is insulated from the hopper $V'$, to which it is fixed.

It will be understood that the pinion $i$ should be insulated from the shaft $m$ to prevent the passage of the current to other parts of the apparatus through the shaft $l$.

When it is desired to recover gold from ore containing silver or one or more of the baser metals in considerable quantity, I sometimes employ the modified form of amalgamator illustrated in vertical section in Fig. 3, which is similar in construction to that shown in Fig. 1, but is furnished with a supplementary collecting-chute $V^*$, in communication with an outlet $V^{}$. When the metals of lower specific gravity than the gold and mercury but of higher specific gravity than the gangue are carried round by the periphery of the drum O to the opening or outlet $V^{}$ they are thrown out through the said opening or outlet by centrifugal action, and, being lighter than the mercury in the chute $V^*$, they ascend to the surface of such mercury and may be withdrawn or skimmed therefrom in the form of "scum" or light amalgam. Any metals which are heavier than the mercury (whether they amalgamate therewith, as in the case of gold, or not, as in the case of platinum) sink by gravity to and collect at the bottom of the amalgamator and are forced into the pipe Z' in Fig. 3 or into the sump T in Fig. 1. Fig. 3 also shows another arrangement of mercurial regulator acting by displacement.

$X^6$ is a solid or hollow displacement body, which can be lowered or raised in the mercury by means of the screw $X^7$ or other suitable device, so as to raise or lower the working-level or head of the said mercury, as may be required.

It will be understood that mercury may be introduced into and withdrawn from the amalgamator continuously if necessary. For example, it may be taken by a pipe $f$ from the bottom of the sump T (see Figs. 1 and 2) and pumped by the pump $b$ through a straining-box $c$, furnished with a wash-leather or other suitable strainer $c'$ and then allowed to flow back into the upper part of the inlet $d$ of the amalgamator through a pipe $e$. A by-pass may be provided to allow of the removal of the strainer containing the amalgam without interfering with the circulation of the mercury.

I claim—

1. The amalgamating apparatus consisting of a cylinder N, containing mercury and having an inlet M' at one end and an outlet U at the other, with a drum O rotating in the said cylinder between the said inlet and outlet, the said drum having grooves or channels S formed across its periphery, a vertically-adjustable mercury-reservoir X, which is in communication with the lower part or sump of the amalgamator-cylinder N by the pipe X', chamber $X^2$, and pipe $X^3$, all arranged and operating substantially as hereinbefore described, and illustrated in the drawings.

2. The amalgamating apparatus consisting of a cylinder N, containing mercury and having an inlet M' at one end and an outlet U at the other, with a drum O rotating in the said cylinder between the said inlet and outlet, the said drum having grooves or channels S formed across its periphery, a vertically-adjustable mercury-reservoir X, which is in communication with the lower part or sump of the amalgamator-cylinder N by the pipe X', chamber $X^2$, and pipe $X^3$, a mercury-circulating pump $b$, a straining-box $c$, and pipes $e\ f$, connecting the said pump and straining-box with the amalgamator-cylinder N, all arranged, combined, and operating substantially as hereinbefore described, and illustrated in the drawings.

In testimony that I claim the foregoing as my invention I have signed my name in presence of two subscribing witnesses.

GEORGE J. ATKINS.

Witnesses:
STEPHEN EDWARD GUNYON,
115 *Cannon Street, London, E. C.*
WILLIAM ANDREW MARSHALL,
50 *Londesborough Road, Stoke Newington, N.*